Aug. 18, 1959     H. J. LAFAYE     2,900,006

RIM CONSTRUCTION

Filed June 12, 1957

INVENTOR.
HILTON J. LAFAYE

BY

ATTORNEY

United States Patent Office 2,900,006
Patented Aug. 18, 1959

2,900,006

RIM CONSTRUCTION

Hilton J Lafaye, Akron, Ohio, assignor to The Goodyear Tire & Rubber Company, Akron, Ohio, a corporation of Ohio Application June 12, 1957, Serial No. 665,256

5 Claims. (Cl. 152—410)

This invention relates to a rim structure and more particularly to a multiple-piece rim structure for use with large size tubeless tires.

With the introduction of tubeless tires, modifications were required in the rim structures in order to provide an airtight rim structure. Multiple-part rims, particularly those of large size which are used on earthmover equipment, are subjected to high torque loads and it is essential that the various rim parts be locked against relative movement with respect to each other. In conventional tire and tube rim structures, a driving lug engages a slot in the base to eliminate relative movement between the rim parts. The commercial rim structures for use with tubeless tires do not require a valve slot since the valve is attached directly to the rim.

The multiple-piece rim structure that is presently the recommended practice of the rim industry for large size tires includes a bead base ring, a bead flange ring and a split lock ring mounted on the rim base. In addition a rubber O ring is mounted between the bead base ring and bead base to seal the rim structure against loss of air through the joints of the rim parts. A driving lug attached to the lock ring engages a slot in the bead base ring and the rim base to prevent relative movement therebetween. Resultingly the driving lug must be firmly attached to the lock ring so that there can be no circumferential movement of the lug around the lock ring. The usual torque loads are substantial in and of themselves and in addition, severe shock loading is also encountered during starting and stopping. The driving lug must remain in position under these conditions. Welding, riveting or the use of other fastening elements heretofore have been used to attach the driving lug but are expensive and require very accurate control to consistently provide acceptable lock rings. It is therefore an object of this invention to provide a new and novel method of attaching a driving lug to a lock ring.

A further object of the invention is to provide a method of attaching the driving lug to the lock ring that is not only relatively inexpensive but also substantially foolproof.

A still further object of the invention is to provide a new and novel lock ring with a driving lug firmly attached thereto.

Another object of this invention is to provide a method of attaching a driving lug to the lock ring which does not require additional fastening elements or processes.

Other objects and advantages of this invention will become apparent hereinafter as the description thereof proceeds, the novel features, arrangements and combinations being clearly pointed out in the specification as well as the claims thereunto appended.

Figure 1:
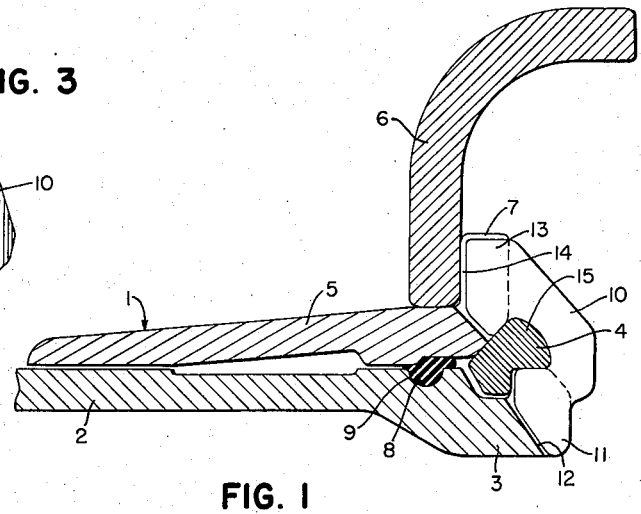
Fig. 1 is a sectional view of a rim in the assembled position.
Figure 3:
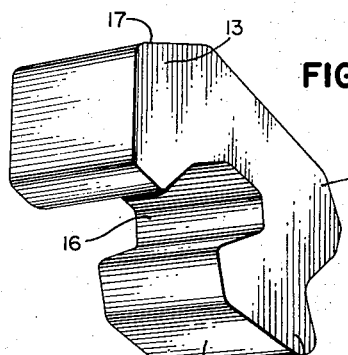
Fig. 3 is a perspective view of the driving lug.

A large earthmover rim 1 of conventional construction for tubeless tires is illustrated in Fig. 1. The rim base 2 has a gutter edge 3 along one side thereof in which a split lock ring 4 is mounted to engage the bead base ring 5 so as to maintain it in position with respect to the rim base 1. A side flange ring 6 engages the up-turned portion 7 of the bead base ring 5 to prevent displacement thereof by the tire bead (not shown). To seal the joints between the bead base ring 5 and rim base 2, a sealing element 8 is maintained under radial and axial distortion in the chamber formed between the groove 9 of the rim base 2 and the inner periphery of the bead base ring 5.

To prevent relative movement between the rim base 2, the bead base ring 5, and the rock ring 4, a driving lug 10 is attached to the lock ring 4. The portion 11 of the drive lug engages a slot 12 in the gutter edge portion of the rim base 2 and the portion 13 engages the slot 14 in the bead base ring 5. The drive lug 10 is crimped on the portion 15 of the lock ring 4 as will be explained so that no circumferential movement between the lock ring 4 and the drive lug 10 can take place.

The drive lug 10 preferably is a forging with a C-shaped opening. The outer portions of the forging are shaped in accordance with the particular rim structure to provide adequate engaging portions for interlocking the various rim sections. The channel 16 or C opening of the lug 10 is straight and is not shaped to conform to the curvature of the lock ring 4. As shown, the lower portion 11 of the lug 10 engages the slot 12 in the gutter edge of the rim base 2 and the upper portion 13 of the lug 10 engages the slot 14 in the bead base ring 5. Preferably, the C opening or channel 16 of the lug 10 is slightly closed so that it will loosely embrace the portion 15 of the lock ring 4 but will remain on the lock ring once it is slipped thereon.

Figure 2:
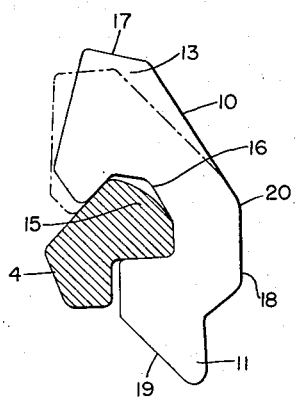
Fig. 2 is a sectional view of the lock ring and driving lug ready to be attached.

In order to crimp the drive lug 10 on the lock ring 4 so that no relative movement between the two can take place, the drive lug is slipped on the portion 15 of the lock ring after the lock ring is transversely separated sufficiently at the split. The lug 10 is then moved circumferentially to the desired position. The solid line position in Fig. 2 illustrates the relation between the drive lug 10 and the lock ring 4 before the crimping operation takes place.

The assembly is then placed between a pair of dies preferably mounted in a press so that the dies engage the upper surface 17 and the lower surface 18 between the lines 19 and 20 of the drive lug 10. As pressure is applied to the lug through the dies, the channel 16 is closed around the portion 15 of the lock ring to the position shown by the dotted lines in Fig. 2 and as seen in Fig. 1.

Figure 4:
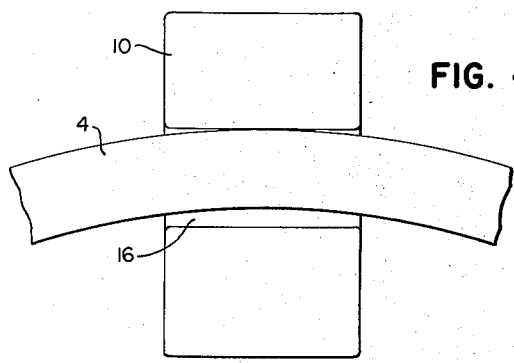
Figs. 4 and 5 are diagrammatic views of illustrating the method of attachment of the driving lug to the lock ring.
Figure 5:
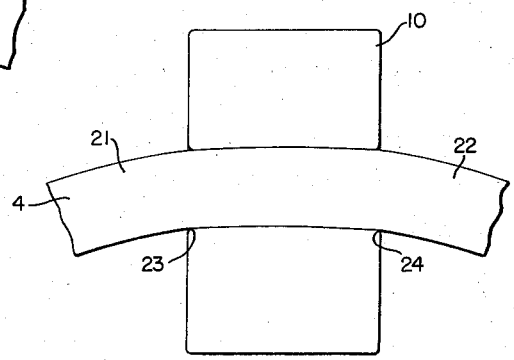

Sufficient pressure is applied during the crimping of the drive lug 10 onto the lock ring 4 so that the radius of curvature of the lock ring 4 embraced by the drive lug 10 is substantially increased as diagrammatically illustrated in Fig. 5. In Fig. 4, the position of the drive lug 10 and lock ring 4 before crimping is illustrated in which the lock ring 4 has a substantial radius of curvature while the drive lug 10 is substantially flat. In closing the channel 16 of the drive lug by the die, the lock ring 4 is substantially flattened as the opposite sides of the channel 16 of the drive lug are moved together around the lock ring 4. A slight radius may be imparted to the drive lug channel 16 by the pressure applied during the crimping operation, but the substantial change in contour is effected on the portion of the lock ring 4 confined within the lug 10. After the drive lug 10 is closed onto the lock ring the adjacent portions 21 and 22 of the lock ring which may be distorted during the crimping of the lug 10 onto the lock ring 4, are coined to restore those portions to their original arc.

Due to the change of the radius of curvature of the lock ring 4 within the drive lug 10, relative movement between the drive lug and lock ring caused by the torque of operating conditions cannot take place. This movement, of course, is prevented by the change from a substantially flat arc to the normal arc of the lock ring. It would be necessary for the drive lug to open up slightly to pass over the humps at either point of change of radius and permit peripheral movement around the lock ring. In addition, the inner corners 23 and 24 of the lug 10 serve as wedge or chisel edges to bite into the lock ring 4 to resist movement of the lug 10 about the ring.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. In the method of attaching a driving lug to the split lock ring of a multiple-piece rim assembly for mounting a tubeless tire thereon, the driving lug interlocking the rim parts to prevent relative movement therebetween, the improvement in attaching the driving lug to said lock ring comprising the steps of providing a driving lug having substantially flat surfaces adapted to engage opposed arcuate surfaces of said lock ring, positioning the lug on the lock ring and applying pressure to the lug to force the flat surfaces of the lug into intimate engagement with the lock ring by reshaping the flat surfaces of the lug to an arcuate shape of a radius greater than the original radius of the arc of the lock ring and simultaneously increasing the radius of the arc of the lock ring to substantially that of the reshaped lug whereby circumferential displacement of the lug around the lock ring is prevented.

2. In the method of attaching a driving lug to the split lock ring of a multiple-piece rim assembly for mounting a tubeless tire thereon, the driving lug interlocking the rim parts to prevent relative movement therebetween, the improvement in attaching the driving lug to said lock ring comprising the steps of providing a driving lug having substantially flat surfaces adapted to engage opposed arcuate surfaces of said lock ring, positioning the lug on the lock ring, applying pressure to the lug to force the flat surfaces of the lug into intimate engagement with the lock ring by reshaping the flat surfaces of the lug to an arcuate shape of a radius greater than the original radius of the arc of the lock ring and simultaneously increasing the radius of the arc of the lock ring to substantially that of the reshaped lug whereby circumferential displacement of the lug around the lock ring is prevented, and coining portions of the lock ring adjacent the driving lug to remove any deformation in said lock ring caused by attaching said driving lug.

3. In the method of attaching a driving lug to the split lock ring of a multiple-piece rim assembly for mounting a tubeless tire thereon, the driving lug interlocking the rim parts to prevent relative movement therebetween, the improvement in attaching the driving lug to said lock ring comprising the steps of providing a driving lug having a pair of spaced oppositely disposed leg portions joined by an intermediate portion to define a generally U-shaped opening in the lug with the surface of the opposed leg portions adapted to engage a portion of opposed arcuate surfaces of said lock ring, positioning the lug on the lock ring and applying pressure to the lug to force the leg surfaces of the lug into intimate engagement with the lock ring by partially closing the U to cause the leg surfaces to contact the lock ring then reshaping the leg surfaces of the lug to an arcuate shape of a radius greater than the original radius of the arc of the lock ring and simultaneously increasing the radius of the arc of the lock ring surfaces to substantially that of the reshaped lug whereby circumferential displacement of the lug around the lock ring is prevented.

4. A multiple-piece rim assembly for mounting tubeless tires thereon which includes a rim base, a bead base ring, a flange ring and a circular split lock ring, said lock ring having a substantial portion thereof having a predetermined uniform radius and a driving lug attached thereto engaging opposed surfaces of the lock ring with the engaging portions of the lock ring and driving lug having a greater radius than the predetermined uniform radius of the lock ring whereby circumferential displacement of the lug around the lock ring is prevented.

5. A multiple-piece rim assembly for mounting tubeless tires thereon which includes a rim base, a bead base ring, a flange ring and a circular split lock ring, said lock ring having a substantial portion thereof having a predetermined uniform radius and a driving lug crimped thereon with engaging opposed surfaces of the lock ring with the engaging portions of the lock ring and driving lug having a greater radius than the predetermined uniform radius of the lock ring whereby circumferential displacement of the lug around the lock ring is prevented.

No references cited.